United States Patent

Nguyen

[11] Patent Number: 5,955,871
[45] Date of Patent: Sep. 21, 1999

[54] VOLTAGE REGULATOR THAT BASES CONTROL ON A STATE OF A POWER CONSERVATION MODE

[75] Inventor: Don J. Nguyen, Portland, Oreg.

[73] Assignee: Intel Corporation, Santa Clara, Calif.

[21] Appl. No.: 09/173,483

[22] Filed: Oct. 14, 1998

[51] Int. Cl.⁶ ...................................................... G05F 1/40
[52] U.S. Cl. ...................... 323/282; 323/285; 395/750.03
[58] Field of Search ................................... 323/282, 283, 323/284, 285, 259; 395/750.03, 750.04, 750.05

[56] References Cited

U.S. PATENT DOCUMENTS

5,745,352  4/1998  Sandri et al. ............................. 363/41

Primary Examiner—Shawn Riley
Attorney, Agent, or Firm—Trop, Pruner, Hu & Miles, P.C.

[57] ABSTRACT

A switching regulator for use with a computer system having a power conservation mode includes a switch circuit, a sampling storage device, a sampling circuit and a controller. The switch circuit is coupled to an input voltage source to produce an output voltage, and the switch circuit provides an indication of a parameter of the regulator. When the computer system is not in a power conservation mode, the controller operates the sampling circuit to provide the indication to the sampling storage device at a switching frequency. When the computer system is in the power conservation mode, the controller operates the sampling circuit to continuously provide the indication to the sampling storage device for substantially the duration of the power conservation mode. Based on the indications provided to the sampling storage device, the controller interacts with the switch circuit to regulate the output voltage.

24 Claims, 7 Drawing Sheets

VOLTAGE REGULATOR THAT BASES CONTROL ON A STATE OF A POWER CONSERVATION MODE

BACKGROUND

The invention relates to a voltage regulator, such as a switching voltage regulator.

A DC-to-DC voltage regulator typically is used to convert a DC input voltage to either a higher or a lower DC output voltage. One type of voltage regulator is a switching regulator which is often chosen due to its small size and efficiency. The switching regulator typically includes one or more switches that are rapidly opened and closed to transfer energy between an inductor (a stand-alone inductor or a transformer, as examples) and an input voltage source in a manner that regulates an output voltage.

Figure 1:
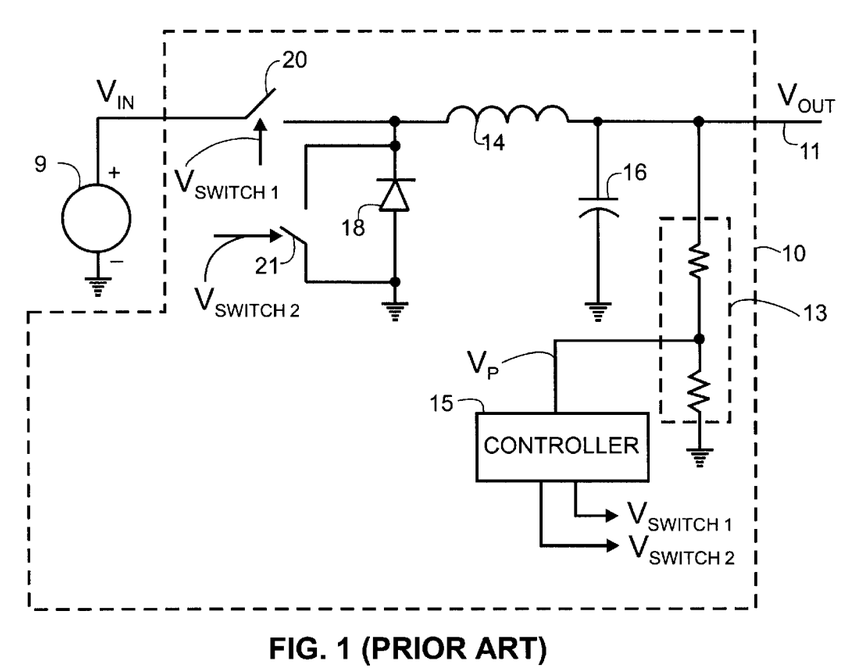
FIG. 1 is a schematic diagram of a switching voltage regulator of the prior art.

As an example, referring to FIG. 1, one type of switching regulator is a synchronous Buck switching regulator 10 that receives an input DC voltage (called $V_{IN}$) from an input voltage source 9 and converts the $V_{IN}$ voltage to a lower regulated output voltage (called $V_{OUT}$) that appears at an output terminal 11. To accomplish this, the regulator 10 may include a switch 20 (a metal-oxide-semiconductor field-effect-transistor (MOSFET), for example) that is operated (via a switching control voltage called $V_{SWITCH1}$) by a controller 15 in a manner to regulate the $V_{OUT}$ voltage.

Figure 2:
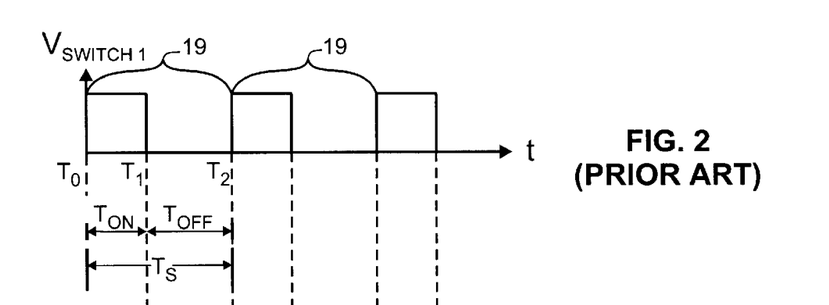
FIGS. 2 and 3 are voltage and current waveforms that illustrate operation of the regulator of FIG. 1.
Figure 3:
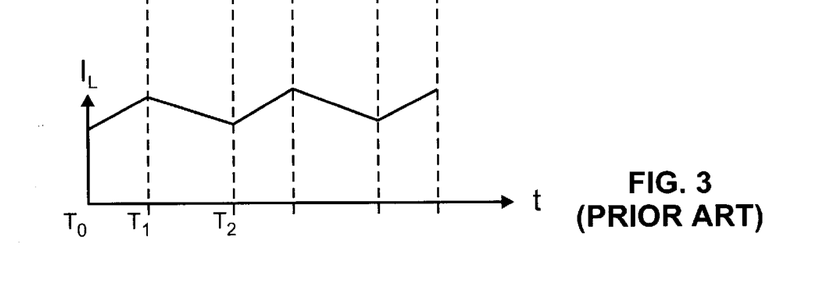

Referring also to FIGS. 2 and 3, in particular, the controller 15 opens and closes the switch 20 to control energization/de-energization cycles 19 (each having a constant duration called $T_S$) of an inductor 14. In each cycle 19, the controller 15 asserts (drives high, for example) the $V_{SWITCH1}$ voltage during an on interval (called $T_{ON}$) to close the switch 20 and transfer energy from the input voltage source 9 to the inductor 14. During the $T_{ON}$ interval, a current (called $I_L$ (see FIG. 3)) of the inductor 14 has a positive slope. During an off interval (called $T_{OFF}$) of the cycle 19, the controller 15 deasserts (drives low, for example) the $V_{SWITCH1}$ voltage to open the switch 20 and isolate the input voltage source 9 from the inductor 14. At this point, the level of the $I_L$ current is not abruptly halted, but rather, a diode 18 (see FIG. 1) begins conducting to transfer energy from the inductor 14 to a bulk capacitor 16 and a load (not shown) that are coupled to the output terminal 11. During the $T_{OFF}$ interval, the $I_L$ current has a negative slope, and the controller 15 may close another switch 21 (via a signal called $V_{SWITCH2}$) to shunt the diode 18 to reduce the amount of power that is otherwise dissipated by the diode 18. The bulk capacitor 16 serves as a stored energy source that is depleted by the load, and additional energy is transferred from the inductor 14 to the bulk capacitor 16 during each $T_{ON}$ interval.

For the Buck switching regulator, the ratio of the $T_{ON}$ interval to the $T_{OFF}$ interval, called a duty cycle, generally governs the ratio of the $V_{OUT}$ to the $V_{IN}$ voltages. Thus, to increase the $V_{OUT}$ voltage, the controller 15 may increase the duty cycle, and to decrease the $V_{OUT}$ voltage, the controller 15 may decrease the duty cycle. For purposes of monitoring the $V_{OUT}$ voltage, the controller 15 may receive a voltage (called $V_P$) that is proportional to the $V_{OUT}$ voltage. The $V_P$ voltage may be provided by a resistor divider 13 that is coupled to the output terminal 11.

The regulator 10 may be used in a computer (a laptop computer, for example) that is capable of entering a power conservation mode, such as a stop clock mode, for example. In the power conservation mode, the power losses introduced by the on-off transitions of the switches 20 and 21 become significant, as compared to the total amount of power being consumed by the computer. Therefore, for purposes of maximizing the efficiency of the regulator 10, the controller 15 may leave the switch 21 open during the power conservation mode.

SUMMARY

In one embodiment, a method for use with a computer system having a power conservation mode includes when the computer system is not in the power conservation mode, sampling indications of a parameter of a switching regulator at a switching frequency. When the computer system is in the power conservation mode, the method includes obtaining a substantially continuous indication of the parameter for substantially the duration of the power conservation mode. An output voltage of the regulator is regulated based on the indications.

DETAILED DESCRIPTION

Figure 4:
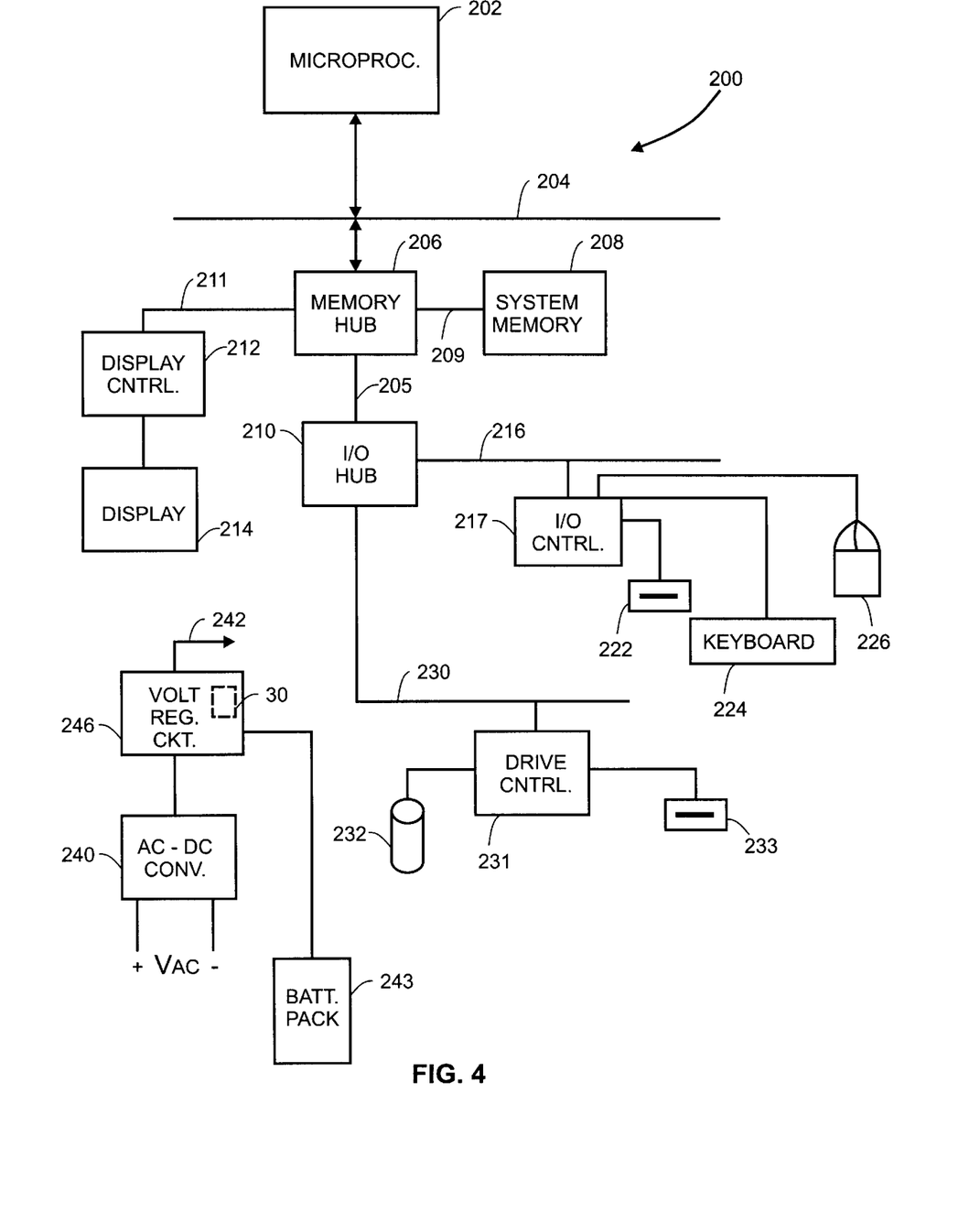
FIG. 4 is a schematic diagram of a computer system according to an embodiment of the invention.

Referring to FIG. 4, an embodiment 200 of a computer system in accordance with the invention includes voltage regulation circuitry 246 that provides power to components of the computer system 200 via power lines 242. As described below, the voltage regulation circuitry 246 has features that enhance the output voltage accuracy and power conversion efficiency of the voltage regulation circuitry 246 when the computer system 200 enters a power conservation mode, such as a stop clock mode, for example.

Figure 5:
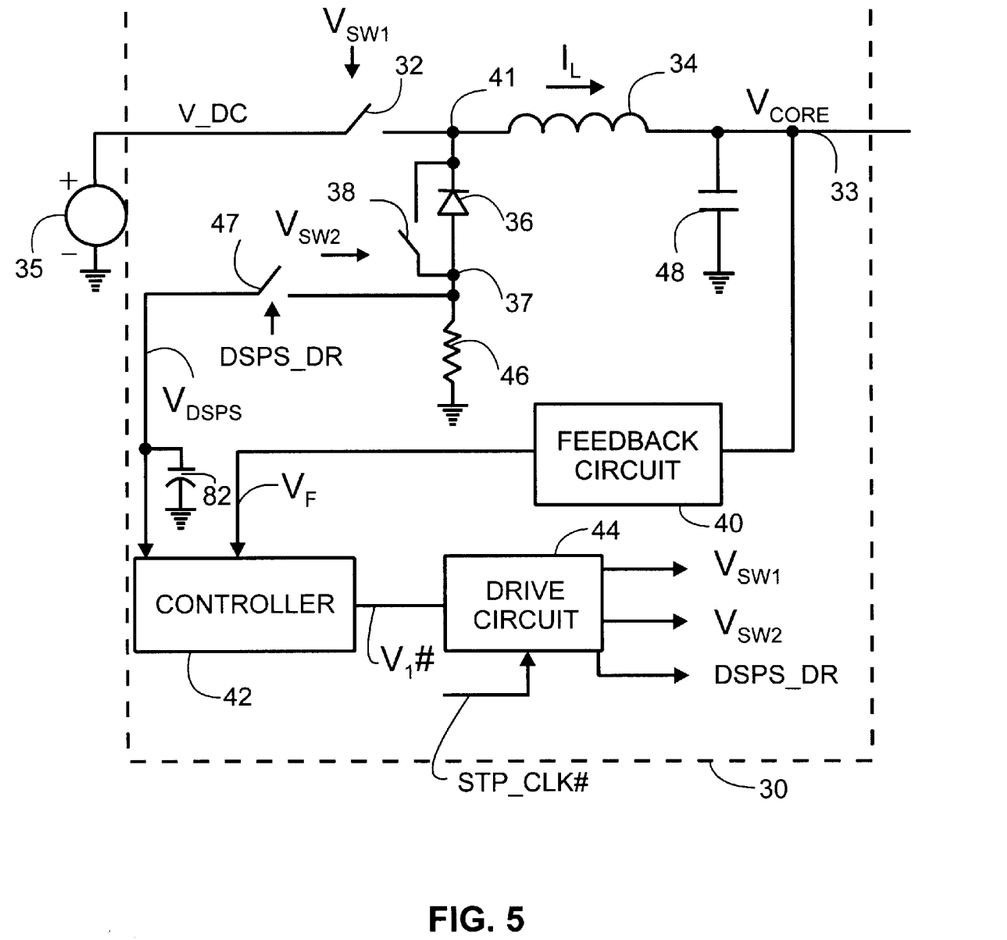
FIG. 5 is a schematic diagram of a switching voltage regulator of the computer system of FIG. 4 according to an embodiment of the invention.
Figure 6:
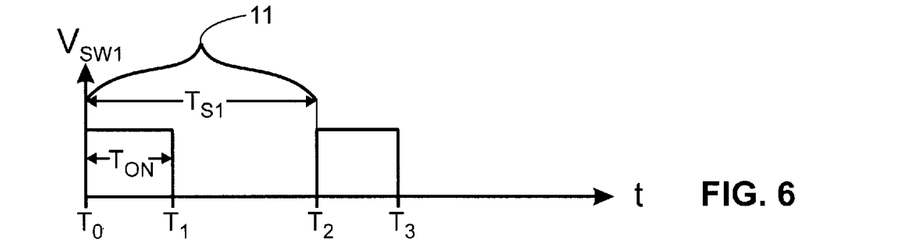
FIGS. 6, 7, 8, 9 and 10 are voltage and current waveforms that illustrate operation of the regulator of FIG. 5 without transient load conditions.
Figure 7:
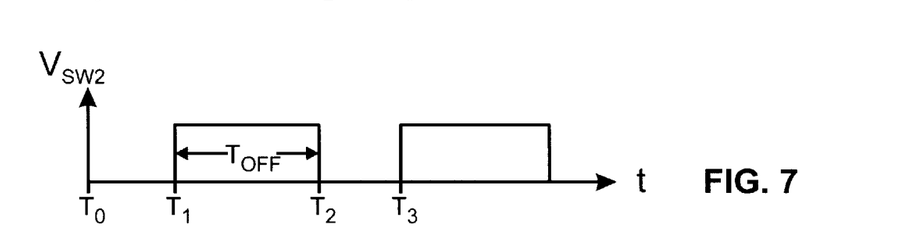
Figure 8:
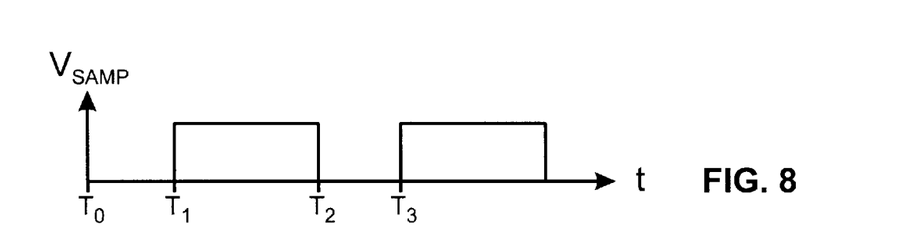

Referring to FIG. 5, as an example, in some embodiments, the voltage regulation circuitry 246 may include a synchronous switching Buck regulator 30 that has its output terminal 33 coupled to one or more of the power lines 242. The regulator 30 includes an inductor 34 that is selectively energized and de-energized to regulate an output voltage (called $V_{CORE}$) that appears at the output terminal 33. To accomplish this, the regulator 30 may include a controller 42 that interacts with a switch drive circuit 44 to generate non-overlapping switching voltages called $V_{SW1}$ and $V_{SW2}$ (see also FIGS. 6 and 7) that control operations of complementary switches 32 and 38, respectively. In this manner, the controller 42 may close the switch 32 (a short time after opening the switch 38) to couple an input voltage source 35

(that provides an input voltage called V_DC) to the inductor 34 during a $T_{ON}$ interval to transfer energy to the inductor 34, and the controller 42 may close the switch 38 (a short time after opening the switch 32) to provide a path for transferring energy from the inductor 34 to the output terminal 33 during a $T_{OFF}$ interval. A bulk capacitor 48 may store part of the energy that is transferred from the inductor 34 and help regulate the $V_{CORE}$ voltage.

For purposes of limiting the amount of power that is dissipated when the computer system 200 is not in the power conservation mode (i.e., when the computer system 200 is in a higher power dissipation state), the controller 42 may lower the $V_{CORE}$ voltage. In some embodiments, the controller 42 may perform this function by monitoring a parameter of the regulator 30 that indicates the power output of the regulator 30 and regulating the $V_{CORE}$ voltage based on the indicated power output. As a result of this technique, the regulator 30 may regulate the $V_{CORE}$ voltage near one of two levels: a lower level when the computer system 200 is not in the power conservation mode and a higher level when the computer system 200 is in the power conservation mode.

For example, the controller 42 may use a sampled indication of the average $I_L$ current and regulate the level of the $V_{CORE}$ voltage based on the sampled average. As a result of this technique, when the computer system 200 enters the power conservation mode, the computer system 200 requires far less $I_L$ current than for operation outside of the power conservation mode, and the controller 42 raises the level of the $V_{CORE}$ voltage in response to a detected low average level of the $I_L$ current. Conversely, when the computer system 200 is not in the power conservation mode, the computer system 200 requires more $I_L$ current, and the controller 42 lowers the level of the $V_{CORE}$ voltage in response to a detected higher average level of the $I_L$ current.

In some embodiments, the controller 42 samples the average $I_L$ current by periodically activating sampling circuitry that may include, for example, a switch 47. In this manner, the controller 42 closes the switch 47 to sample a voltage across a sampling resistor 46 that is in series with the parallel combination of the switch 38 and the diode 36. The closing of the switch 47 stores a sampled voltage (called $V_{DSPS}$) in a storage device, such as a sampling capacitor 82. The controller 42, in turn, uses the $V_{DSPS}$ voltage to regulate the $V_{CORE}$ voltage, in a manner described below.

When the computer system 200 is not in the power conservation mode, the controller 42 closes and opens the switch 47 (via a voltage called DSPS_DR) concurrently with the switch 38 to update the $V_{DSPS}$ voltage. However, when the computer system 200 is in the power conservation mode, the controller 42 operates the switch 47 in a different manner to conserve power and accurately indicate the average $I_L$ current, as described below.

More specifically, the switching losses introduced by the on-off transitions of the switches (the switches 38 and 47, as examples) become significant during the power conservation mode, as compared to the total amount of power being used by the computer system 200. Therefore, for purposes of maximizing the efficiency of the regulator during the power conservation mode, a regulator could possibly open both of the switches 38 and 47 during the power conservation mode, and as a result, the regulator may effectively become a non-synchronous Buck converter during the power conservation mode.

However, it has been discovered that the power conservation mode may last for a time that is sufficient to substantially deplete the charge stored on the sampling capacitor 82 if the switch 47 is left open during the power conservation mode. Therefore, because the $V_{DSPS}$ voltage controls the $V_{CORE}$ voltage (as described below), depletion of charge from the sampling capacitor 82 may cause the controller 42 to set the $V_{CORE}$ voltage to an incorrect voltage level.

For purposes of ensuring that the $V_{DSPS}$ voltage accurately indicates the average $I_L$ current, the regulator 30 does not open the switch 47 during the power conservation mode. Instead, the regulator 30 closes the switch 47 for substantially the entire duration of the power conservation mode to continuously provide the voltage across the resistor 46 to the capacitor 82. The continuous closing of the switch 47 also minimizes power losses due to switching, as the switch 47 does not open and close at the switching frequency during the power conservation mode. Thus, by keeping the switch 47 closed during the power conservation mode, the regulator 30 maintains the $V_{DSPS}$ voltage at the appropriate level and as a result, maintains the $V_{CORE}$ voltage at the appropriate level.

Thus, the advantages of the above-described arrangement may include one or more of the following: power losses may be minimized; accurate voltage regulation may be achieved during the power conservation mode; and efficiency of the regulator may be enhanced.

The current sensing resistor 46 may be coupled between a sampling node 37 and ground and may also be coupled in series with the parallel combination of the diode 36 and the main current path of the switch 38. The anode of the diode 36 may be coupled to the sampling node 37, and the cathode of the diode 36 may be coupled to a node 41. The inductor 34 may be coupled between the node 41 and the output terminal 33, and the main current path of the switch 32 may be coupled between the input voltage source 35 and the node 41. The main current path of the switch 47 may be coupled between the sampling node 37 and one terminal of the sampling capacitor 82. The other terminal of the sampling capacitor 82 may be coupled to ground.

A typical controller may operate the switches 32 and 38 at a fixed switching frequency and regulate a duty cycle of the switching based on a monitored level of the $V_{CORE}$ voltage. However, unlike the typical controller, the controller 42 regulates the $V_{CORE}$ voltage by monitoring an indication (provided by a voltage called $V_F$ that is proportionate to the $V_{CORE}$ voltage, for example) of the $V_{CORE}$ voltage and controlling the frequency of the switching based on this indication. The $V_F$ voltage is furnished by a feedback circuit 40.

In some embodiments, the controller 42 interacts with the drive circuit 44 by generating a voltage called $V_1$# (wherein the suffix "#" denotes negative, or inverse logic) that the drive circuit 44 receives and converts into the $V_{SW1}$ and $V_{SW2}$ voltages. The $V_{SW1}$ voltage generally indicates the complement of the $V_1$# voltage, and the $V_{SW2}$ voltage generally indicates the $V_1$# voltage. The drive circuit 44 includes circuitry to prevent the $V_{SW1}$ and $V_{SW2}$ voltages from overlapping to keep the regulator 30 functioning properly.

Figure 9:
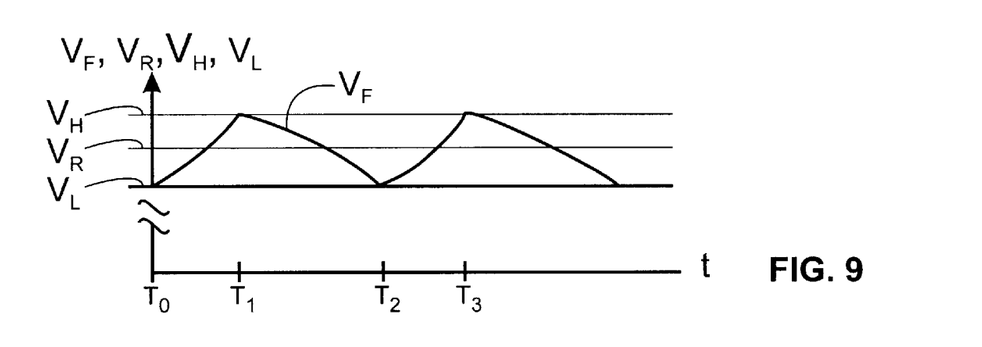

In some embodiments, to regulate the switching frequency, the controller 42 regulates a ripple voltage component that is present in the $V_{CORE}$ voltage. Referring also to FIG. 9, in this manner, the controller 42 monitors the $V_F$ voltage, and in response, the controller 42 operates the switches 32 and 38 (via selective assertion of the $V_1$# voltage) to keep the $V_F$ voltage between a high voltage threshold (called $V_H$) and a low voltage threshold (called $V_L$). This regulation, in turn, keeps the $V_{CORE}$ voltage within predetermined regulated limits (limits within 5% of a predetermined voltage level, for example).

Referring to FIGS. 5, 6, 7, 9 and 10, the controller 42 regulates the switches 32 and 38 in the following manner for an exemplary energization/de-energization cycle 11 that lasts from time $T_0$ to time $T_2$. First, the controller 42 interacts with the drive circuit 44 to assert, or drive high, the $V_{SW1}$ voltage at time $T_0$. The assertion of the $V_{SW1}$ voltage causes the switch 32 to close. Once this occurs, the $I_L$ current (see FIG. 10) has a positive slope, as energy is being stored in the inductor 34 from time $T_0$ to time $T_1$. Also during the interval from time $T_0$ to time $T_1$, the $V_F$ voltage rises upwardly from the low threshold voltage $V_L$ to the upper threshold voltage $V_H$. In this manner, at time $T_1$, the $V_F$ voltage reaches the upper threshold $V_H$. The controller 42 detects this occurrence and responds by interacting with the drive circuit 44 to deassert, or drive low, the $V_{SW1}$ voltage to open the switch 32.

Figure 10:
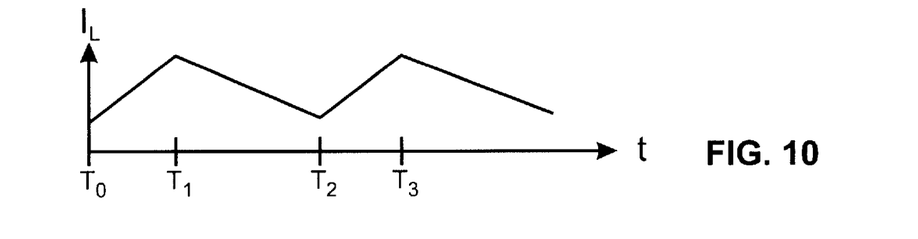

The opening of the switch 32 begins an interval during which energy is transferred from the inductor 34 to the bulk capacitor 48. After the switch 32 opens, the diode 36 conducts and allows energy to be transferred from the inductor 34 and to the output terminal 33. The $I_L$ circuit assumes a negative slope from time $T_1$ to $T_2$. A short time after the controller 42 deasserts the $V_{SW1}$ voltage, the controller 42 asserts the $V_{SW2}$ voltage to close the switch 38. The closed switch 38, in turn, shunts the diode 36 which reduces the effective resistance path for the $I_L$ current and thus, reduces the power that is otherwise dissipated by the diode 36.

The controller 42 asserts the $V_{SW2}$ voltage from time $T_1$ to $T_2$ to allow energy to be transferred from the inductor 34. This transfer of energy causes the $V_F$ voltage (which indicates the $V_{CORE}$ voltage) to decrease from the $V_H$ threshold to the $V_L$ threshold. When the $V_F$ voltage reaches the $V_L$ threshold at time $T_2$, this event causes the controller 42 to interact with the drive circuit 44 to deassert the $V_{SW2}$ voltage, which, in turn, causes the switch 38 to open. A short time thereafter, the controller 42 closes the switch 32 to begin another energization/de-energization cycle.

Thus, for the regulator 30 the switching frequency and duty cycle are not constant, but rather, the controller 42 may dynamically adjust both to accommodate changing load conditions. As an example, the waveforms shown in FIGS. 6, 7, 9 and 10 illustrate a scenario when the $V_{CORE}$ voltage stays within regulation (i.e., the proportionate $V_F$ voltage stays within the $V_H$ and $V_L$ limits) and no load transient load conditions occur. However, referring to FIGS. 11, 12, 13 and 14, a different scenario may occur in which the requirements of the load change rapidly and cause the $V_{CORE}$ voltage to undershoot or overshoot predetermined regulated limits. However, the regulator 30, because of its variable frequency and duty cycle control, responds rapidly to this scenario, as described below.

Figure 11:
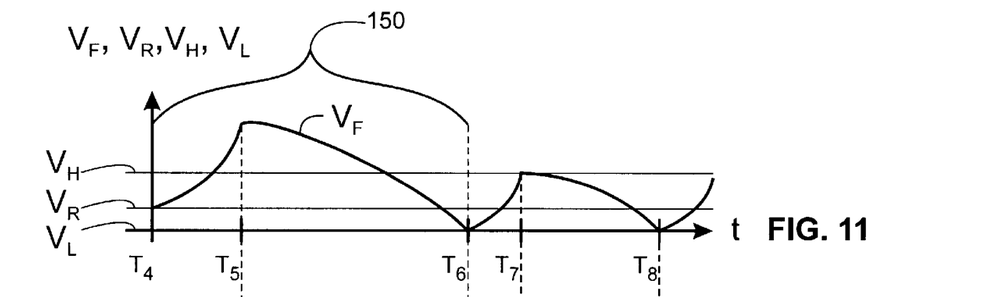
FIGS. 11, 12, 13 and 14 are voltage and current waveforms that illustrate operation of the regulator of FIG. 5 with transient load conditions.
Figure 12:
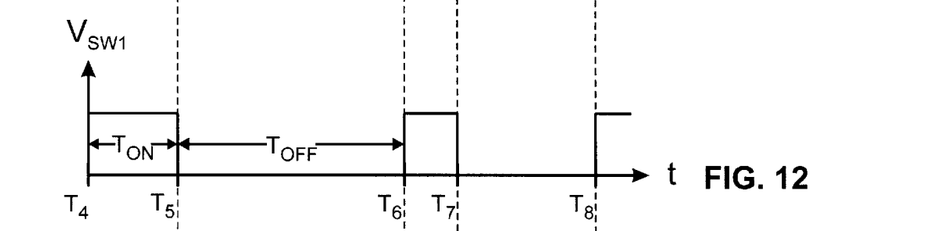
Figure 13:
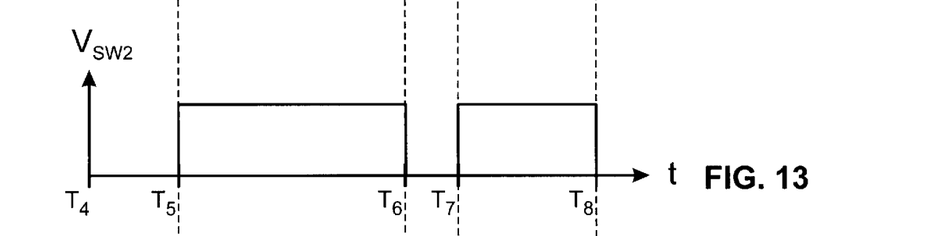
Figure 14:
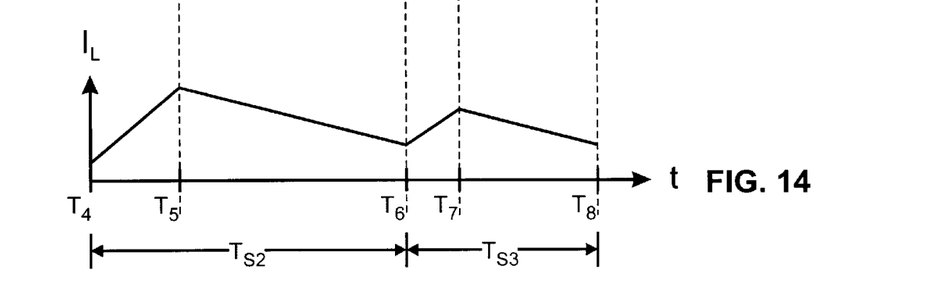

In particular, referring to FIG. 11, another exemplary power cycle 150 begins at time $T_4$. During the power cycle 150, the $V_F$ voltage may rise to a voltage above the $V_H$ threshold. When the controller 42 responds to this occurrence at time $T_5$, the controller 42 interacts with the drive circuit 44 to deassert the $V_{SW1}$ voltage to open the switch 32. The opening of the switch 32 prevents additional energy from being transferred from the input voltage source 35 to the inductor 34. From time $T_5$ to time $T_6$, the $I_L$ current assumes a negative slope and transfers energy from the inductor 34, an event that lowers the $V_{CORE}$ voltage. The interval from times $T_5$ to $T_6$ is sufficient to allow the $V_{CORE}$ voltage to decrease back to a regulated range of values. When the $V_F$ voltage drops to the $V_L$ threshold at time $T_6$, the controller 42 interacts with the drive circuit 44 to assert the $V_{SW1}$ voltage to once again close the switch 32 and cause the $V_{CORE}$ voltage to rise. Thus, due to the above-described mechanism, the $T_{OFF}$ time is variable, as the switch 32 stays closed for an appropriate time for regulation to occur. Conversely, in the opposite situation when a voltage droop (instead of a voltage surge) in the $V_{CORE}$ voltage occurs, the controller 42 permits a variable $T_{ON}$ time to allow additional energy to be transferred into the inductor 34 to raise the level of the $V_{CORE}$ voltage.

Figure 15:
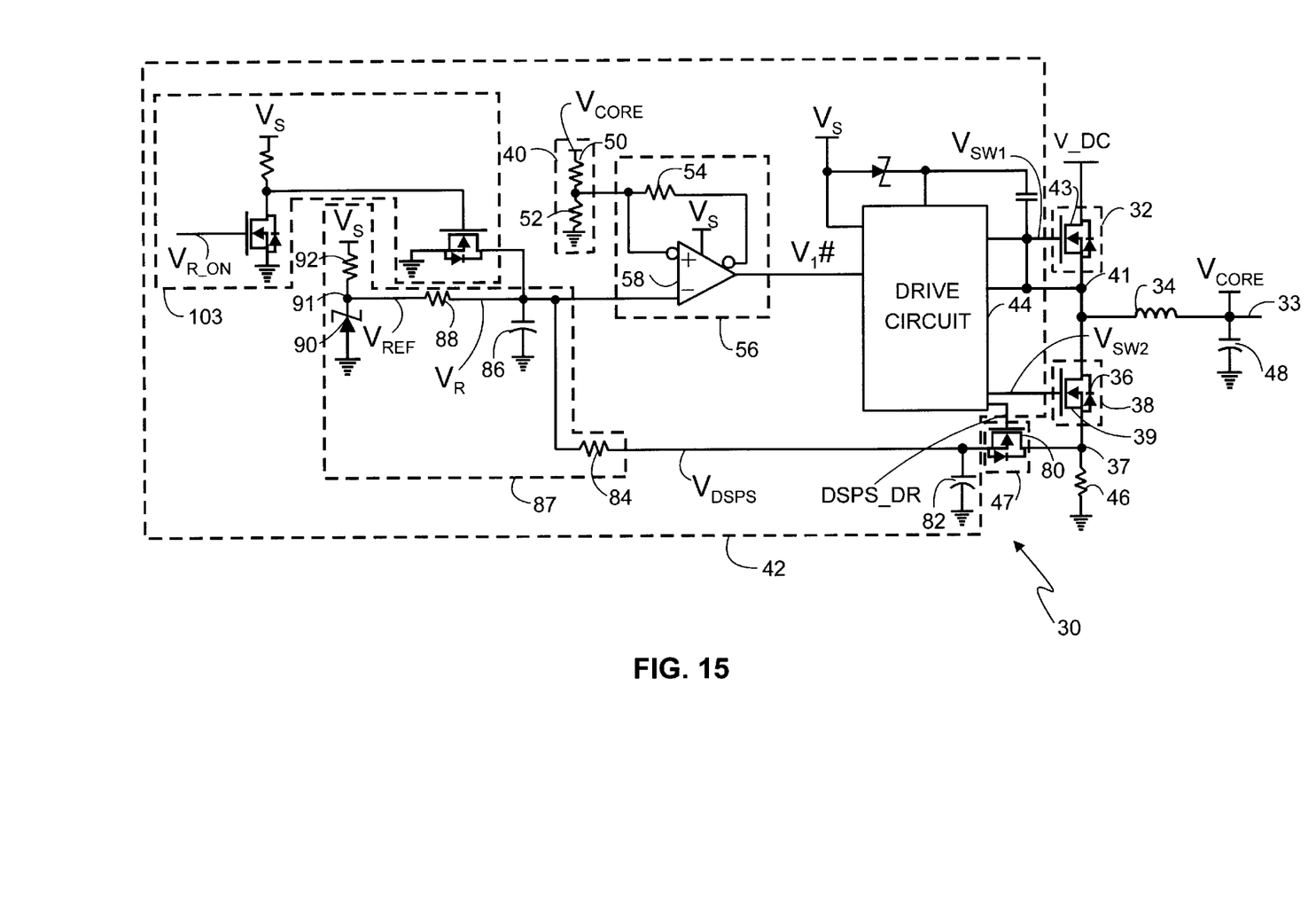
FIG. 15 is a more detailed schematic diagram of the regulator of FIG. 5 according to an embodiment of the invention.

Referring to FIG. 15, in some embodiments, the controller 42 may include a hysteretic comparator circuit 56 which compares the $V_F$ voltage to the $V_H$ and $V_L$ thresholds to generate the $V_1$# voltage. The $V_1$# voltage, in turn, is used by the drive circuit 44 to generate the $V_{SW1}$ and $V_{SW2}$ voltages. In this manner, the circuit 56 may include a comparator 58 (a comparator with a 10 nanosecond (ns) propagation delay, for example) that furnishes the $V_1$# voltage at an inverting output terminal. The circuit 56 may be coupled to the feedback circuit 40 that is formed from resistors 50 and 52 and furnishes the $V_F$ voltage at the union the resistors 50 and 52. A resistor 54 (of the circuit 56) is coupled between the inverting input and output terminals of the comparator 58 to establish the hysteretic thresholds $V_L$ and $V_H$. The non-inverting input terminal of the comparator 58 receives a reference voltage (called $V_R$) which may be located approximately midway between the $V_H$ and $V_L$ thresholds, as shown in FIG. 11, and is used, in some embodiments, to adjust the level of the $V_{CORE}$ voltage based on the power output of the regulator 30, as described below.

Thus, due to the above-described arrangement, the comparator 58 asserts (drives high, for example) the $V_1$# voltage when the $V_F$ voltage decreases below the $V_L$ threshold and deasserts (drives low, for example) the $V_1$# voltage when the $V_F$ voltage rises above the $V_H$ threshold.

In some embodiments, the switch 32 may include a metal-oxide-semiconductor field-effect-transistor (MOSFET) 43 which has its drain arranged to receive the V_DC voltage and its source coupled to the node 41. The gate of the MOSFET 43 receives the $V_{SW1}$ voltage. The switch 38 may include a MOSFET 39 which has its drain coupled to the node 41 and its source coupled to the sampling node 37. The gate of the MOSFET 39 receives the $V_{SW2}$ voltage. The diode 36 may be an intrinsic diode of the MOSFET 39, for example. The switch 47 may include a MOSFET 80 that has its drain coupled to the sampling node 37 and its source serially coupled to one terminal of a resistor 84 of a voltage adjustment circuit 87, as described below.

Among other features of the voltage adjustment circuit 87, the other terminal of the resistor 84 is coupled to the non-inverting input terminal of the comparator 58 and provides the $V_R$ voltage. The output voltage adjustment circuit 87 may also include a capacitor 86 that is coupled between the non-inverting input terminal of the comparator 58 and ground. A resistor 88 is coupled between the non-inverting input terminal of the comparator 58 and a node 91. The node 91, in turn, provides a reference voltage (called $V_{REF}$). A resistor 92 is coupled between the node 91 and a positive voltage supply, and a Zener diode 90 has its cathode coupled to the node 90 and its anode coupled to the ground. In this manner, at powerup, the Zener diode 90 establishes the $V_{REF}$ voltage.

Because the $V_{DSPS}$ voltage indicates the average $I_L$ current, the $V_{DSPS}$ voltage decreases during the power conservation mode and, in turn, decreases the level of the $V_R$ voltage due to the following relationship:

$$V_R = (V_{REF} - V_{DSPS}) \cdot \left(\frac{R_{84}}{R_{84} + R_{88}}\right) + V_{DSPS},$$

where $R_{84}$ and $R_{88}$ represent the resistances of resistors 84 and 88, respectively, and $V_{REF}$ represents a reference voltage. Therefore, because of the comparison that is performed by the comparator circuit 56, the downward adjustment of the $V_R$ voltage during the power conservation mode of the computer system 200 upwardly adjusts the $V_{CORE}$ voltage. Conversely, the $V_{DSPS}$ voltage increases when the computer system 200 is not in the power conservation mode and downwardly adjusts the $V_{CORE}$ voltage.

In some embodiments, the regulator 30 may include a powerup circuit 103 to hold the $V_R$ voltage to ground during powerup. The end of powerup may be indicated by the insertion of a $V_{R\_ON}$ voltage. When powerup has occurred, then the circuit 103 decouples itself from the non-inverting input terminal of the comparator 58, and allows the circuitry to behave as described above.

Figure 16:
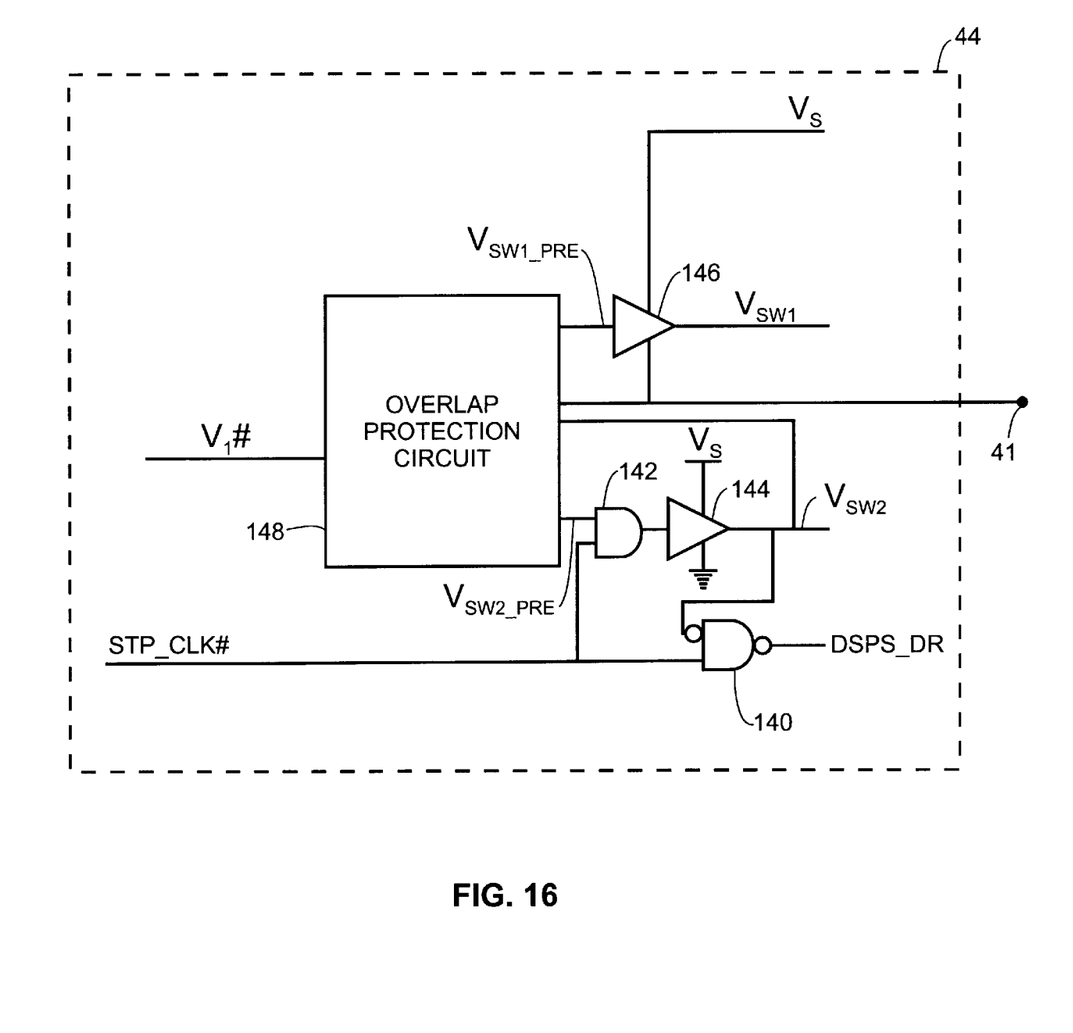
FIG. 16 is a schematic diagram of the driver circuit of FIG. 15.

Referring to FIG. 16, the drive circuit 44 includes a voltage buffer, or driver 144, that furnishes the $V_{SW2}$ voltage at its output terminal. An inverted indication of the $V_{SW2}$ voltage is received by an input terminal of a NAND gate 140. Another input terminal of the NAND gate 140 receives a STP_CLK# signal which is asserted, or driven low, to indicate the power conservation mode and deasserted, or driven high, otherwise. The output terminal of the NAND gate 140 furnishes a DSPS_DR signal that is received by the gate of the sampling transistor 80. Therefore, as a result of this arrangement, when the computer system 200 is in the power conservation mode, the NAND gate 140 asserts the DSPS_DR signal to cause the sampling transistor 80 to conduct, and when the computer system 200 is not in the power conservation mode, the state of the DSPS_DR signal closely follows the state of the $V_{SW2}$ voltage.

The drive circuit 44 may also include an overlap protection circuit 148 that uses the $V_1$# voltage to generate two non-overlapping voltages called $V_{SW1\_PRE}$ and $V_{SW1\_PRE}$. The $V_{SW1\_PRE}$ voltage generally follows the complement of the $V_1$# signal, and the $V_{SW2\_PRE}$ voltage generally follows the $V_1$# voltage. A driver 146 receives the $V_{SW1\_PRE}$ voltage and furnishes the $V_{SW1}$ voltage. An AND gate 142 receives the $V_{SW2\_PRE}$ voltage and the STP_CLK# signal. The output terminal of the AND gate 142 is coupled to an input terminal of a driver 144, and the output terminal of the driver 144 furnishes the $V_{SW2}$ voltage. In this manner, when the computer system 200 is not in the power conservation mode (i.e., when the STP_CLK# signal is deasserted), the $V_{SW2}$ voltage follows the $V_{SW2\_PRE}$ voltage. However, when the computer system 200 is in the power conservation mode (i.e., when the STP_CLK# signal is asserted), the $V_{SW2}$ voltage is deasserted.

Referring back to FIG. 4, in addition to the voltage regulation circuitry 246, the computer system 200 may also include an AC-to-DC converter 240 that may receive an AC wall voltage and convert the AC voltage into a DC voltage that is provided to the voltage regulation circuitry 246. The voltage regulation circuitry 246 may also receive a DC voltage from a battery pack 243 that furnishes power when AC power is unavailable.

Among the components that consume power, the computer system 200 may include a microprocessor 202 and a bridge circuit, or memory hub 206, both of which are coupled to a local, or front side, bus 204. The memory hub 206 may interface the front side bus 204, a memory bus 209 and an Accelerated Graphics Port (AGP) bus 211 together. A system memory 208 may be coupled to the memory bus 209, and a display controller 212 (that controls a display 214) may be coupled to the AGP bus 211. A hub communication link 205 may couple the memory hub 206 to a downstream bridge circuit, or input/output (I/O) hub 210.

The I/O hub 210 may include interfaces to an Industry Standard Architecture (ISA) bus 216 and a Peripheral Component Interconnect (PCI) bus 230. An I/O controller 217 may be coupled to the ISA bus 216 and receive input data from a keyboard 224 and a mouse 226, as examples. The I/O controller 217 may also control operations of a floppy disk drive 222. A drive controller 231 may be coupled to the PCI bus 230 and may control operations of a hard disk drive 232 and a CD-ROM drive 233, as examples.

While the invention has been disclosed with respect to a limited number of embodiments, those skilled in the art, having the benefit of this disclosure, will appreciate numerous modifications and variations therefrom. It is intended that the appended claims cover all such modifications and variations as fall within the true spirit and scope of the invention.

What is claimed is:

1. A switching regulator for use with a computer system having a power conservation mode, comprising:
    a switch circuit coupled to an input voltage source to produce an output voltage;
    a sampling storage device;
    a sampling circuit; and
    a controller to:
        operate the sampling circuit to first provide an indication of the output voltage to the sampling storage device at a switching frequency when the computer system is not in the power conservation mode,
        when the computer system is in the power conservation mode, operate the sampling circuit to continuously provide the indication to the sampling storage device for substantially the duration of the power conservation mode, and
        based on the first and continuously provided indications, interact with the switch circuit to regulate the output voltage.

2. The switching regulator of claim 1, wherein the sampling circuit comprises a switch to selectively provide the indication to the sampling storage device.

3. The switching regulator of claim 2, wherein the switch comprises a transistor.

4. The switching regulator of claim 1, wherein the sampling storage device comprises a capacitor.

5. The switching regulator of claim 1, wherein the switch circuit comprises:
    a switch; and
    an energy storage element,
    wherein the controller further operates the switch to regulate the output voltage when the computer system is in the power conservation mode based on the continuously provided indication.

6. The switching regulator of claim 1, wherein the indication comprises an indication of a current.

7. The switching regulator of claim 1, wherein the switch circuit comprises:
    a switch; and
    an energy storage element,
    wherein the controller further operates the switch to regulate the output voltage when the computer system is not in the power conservation mode based on the first provided indications.

8. The switching regulator of claim 1, wherein the switching regulator comprises a synchronous Buck switching regulator when the computer system is not in the power conservation mode.

9. A method for use with a computer system having a power conservation mode comprising:
when the computer system is not in the power conservation mode, sampling indications of an output voltage at a switching frequency;
when the computer system is in the power conservation mode, obtaining a substantially continuous indication of the output voltage for substantially the duration of the power conservation mode, and
regulating the output voltage of the regulator based on the continuous and sampled indications.

10. The method of claim 9, further comprising: coupling a sensing element of the regulator to a storage element at the switching frequency when the computer system is not in the power conservation mode.

11. The method of claim 9, further comprising:
operating a switch to regulate the output voltage when the computer system is not in the power conservation mode based on the sampled indications.

12. The method of claim 9, further comprising:
operating a switch to regulate the output voltage when the computer system is in the power conservation mode based on the continuous indication.

13. A computer system having a power conservation mode comprising:
a processor; and
a switching regulator coupled to provide an output voltage to the processor to:
obtain sampled indications of the output voltage at a switching frequency when the computer system is not in the power conservation mode;
obtain a substantially continuous indication of the output voltage when the computer system is in the power conservation mode; and
regulate the output voltage based on the continuous and sampled indications.

14. The computer system of claim 13, wherein the regulator comprises:
a switch;
a sensing element to indicate the parameter;
a storage element to store the sampled indications; and
a controller to cause the switch to couple the sensing element to the storage element at the switching frequency when the computer system is not in the power conservation mode.

15. The computer system of claim 13, wherein the regulator comprises:
a switch; and
an energy storage element, wherein the controller further operates the switch to regulate the output voltage when the computer system is not in the power conservation mode based on the sampled indications.

16. The computer system of claim 13, wherein the regulator comprises:
switch; and
an energy storage element, wherein the controller further operates the switch to regulate the output voltage when the computer system is in the power conservation mode based on the continuous indication.

17. The computer system of claim 13, wherein the indication comprises an indication of a current.

18. A computer system having a power conservation mode, comprising:
a processor;
a switch circuit coupled to an input voltage source to furnish an output voltage to the processor;
a sampling storage device;
a sampling circuit; and
a controller to:
operate the sampling circuit to provide an indication of the output voltage to the sampling storage device at a switching frequency when the computer system is not in the power conservation mode;
when the computer system is in the power conservation mode, operate the sampling circuit to continuously provide the indication of the output voltage to the sampling storage device for substatially the duration of the power conservation mode, and
based on the sampled and continuous indications, interact with the switch circuit to the output voltage.

19. The computer system of claim 18, wherein the sampling circuit comprises a switch coupled to the sampling storage device.

20. The computer system of claim 19, wherein the switch comprises a transistor.

21. The computer system of claim 18, wherein the sampling storage device comprises a capacitor.

22. The computer system of claim 18, wherein the switch circuit comprises:
a switch; and
an energy storage element,
wherein the controller further operates the switch to regulate the output voltage when the computer system is in the power conservation mode based on the continuously provided indication.

23. The computer system of claim 18, wherein the switch circuit comprises:
a switch; and
an energy storage element,
wherein the controller further operates the switch to regulate the output voltage when the computer system is not in the power conservation mode based on the indications provided at the switching frequency.

24. The computer system of claim 18, wherein the switching regulator comprises a synchronous Buck switching regulator during the power conservation mode.

* * * * *

UNITED STATES PATENT AND TRADEMARK OFFICE
CERTIFICATE OF CORRECTION

PATENT NO. : 5,955,871
DATED : September 21, 1999
INVENTOR(S) : Don J. Nguyen

It is certified that error appears in the above-identified patent and that said Letters Patent is hereby corrected as shown below:

In col. 9, line 18, after "comprising:", please delete "coupling".

In col. 9, line 19, before "a sensing", please insert --  coupling--.

In col. 10, line 5, before "switch", please insert --a--.

In col. 10, line 30, after "circuit to", please insert --regulate--.

Signed and Sealed this

First Day of February, 2000

Attest:

Attesting Officer

Q. TODD DICKINSON

Acting Commissioner of Patents and Trademarks